United States Patent
Takahashi

(10) Patent No.: US 9,313,357 B2
(45) Date of Patent: Apr. 12, 2016

(54) IMAGE READING DEVICE AND IMAGE FORMING APPARATUS INCORPORATING SAME

(71) Applicant: Hiroshi Takahashi, Kanagawa (JP)

(72) Inventor: Hiroshi Takahashi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/637,916

(22) Filed: Mar. 4, 2015

(65) Prior Publication Data
US 2015/0264215 A1 Sep. 17, 2015

(30) Foreign Application Priority Data

Mar. 11, 2014 (JP) .................................. 2014-047591
Sep. 8, 2014 (JP) .................................. 2014-182136

(51) Int. Cl.
*H04N 1/04* (2006.01)
*H04N 1/10* (2006.01)

(52) U.S. Cl.
CPC .................................. *H04N 1/1008* (2013.01)

(58) Field of Classification Search
CPC .......... H04N 2201/02416; H04N 2201/02418; H04N 2201/02429; H04N 2201/02431; H04N 2201/02441; H04N 2201/04796; H04N 1/03; G02B 5/3033; G09G 5/00; G09G 5/36; G09G 5/377; H01J 2237/2007; H01J 2237/20
USPC ................ 358/474, 1.13, 497, 1.12, 1.9, 498, 358/1.14, 1.15, 1.2, 1.5, 447, 461, 464
See application file for complete search history.

(56) References Cited

U.S. PATENT DOCUMENTS

| | | | | |
|---|---|---|---|---|
| 4,905,096 A | * | 2/1990 | Moriya | 358/451 |
| 5,325,213 A | * | 6/1994 | Takahashi et al. | 358/474 |
| 5,390,033 A | * | 2/1995 | Bannai et al. | 358/498 |
| 5,471,277 A | * | 11/1995 | Fujioka et al. | 355/25 |
| 5,933,248 A | * | 8/1999 | Hirata | 358/406 |
| 6,178,274 B1 | * | 1/2001 | Youda et al. | 382/312 |
| 6,671,421 B1 | * | 12/2003 | Ogata et al. | 382/284 |
| 6,791,713 B1 | * | 9/2004 | Takahashi et al. | 358/1.9 |
| 7,391,543 B2 | * | 6/2008 | Ohara | 358/483 |
| 7,535,602 B2 | * | 5/2009 | Ohara | 358/474 |
| 7,800,790 B2 | * | 9/2010 | Kageyama et al. | 358/474 |
| 8,570,618 B2 | * | 10/2013 | Washida | 358/474 |

(Continued)

FOREIGN PATENT DOCUMENTS

| | | |
|---|---|---|
| JP | 2007-097054 | 4/2007 |
| JP | 2009-055175 | 3/2009 |
| JP | 2009-232035 | 10/2009 |

*Primary Examiner* — Negussie Worku
(74) *Attorney, Agent, or Firm* — Harness, Dickey & Pierce, P.L.C.

(57) ABSTRACT

An image reading device includes a contact glass, an image sensor, a holder, a mount, a biasing member, and an adjusting screw. The image sensor reads image data from a document through the contact glass. The image sensor includes plural reading elements arranged on an identical line along a main scanning direction. The holder holds the image sensor. The mount mounts the holder including a screw hole. The holder is movable toward and away from the contact glass. The biasing member biases the holder toward the contact glass. The adjusting screw is attached to the screw hole to adjust a position of the holder relative to the contact glass against a biasing force of the biasing member by advancing and retreating in an axial direction of the screw hole. The biasing member and the adjusting screw are arranged on an identical straight line along the main scanning direction.

18 Claims, 17 Drawing Sheets

(56) References Cited

U.S. PATENT DOCUMENTS

| | | |
|---|---|---|
| 2006/0193014 A1* | 8/2006 | Kageyama et al. ............ 358/474 |
| 2006/0250664 A1* | 11/2006 | Chien ........................... 358/474 |
| 2007/0109613 A1* | 5/2007 | Sakakibara ................... 358/486 |
| 2009/0180021 A1* | 7/2009 | Kikuchi et al. ............... 348/349 |
| 2010/0111489 A1* | 5/2010 | Presler ........................... 386/52 |
| 2011/0051200 A1* | 3/2011 | Iwasaki et al. ................ 358/474 |
| 2011/0141294 A1* | 6/2011 | Lam et al. .................. 348/208.1 |

* cited by examiner

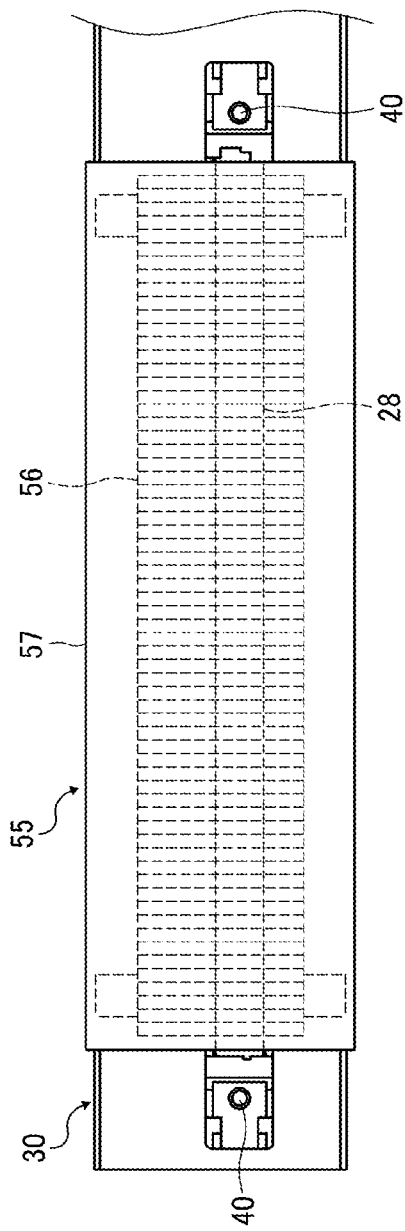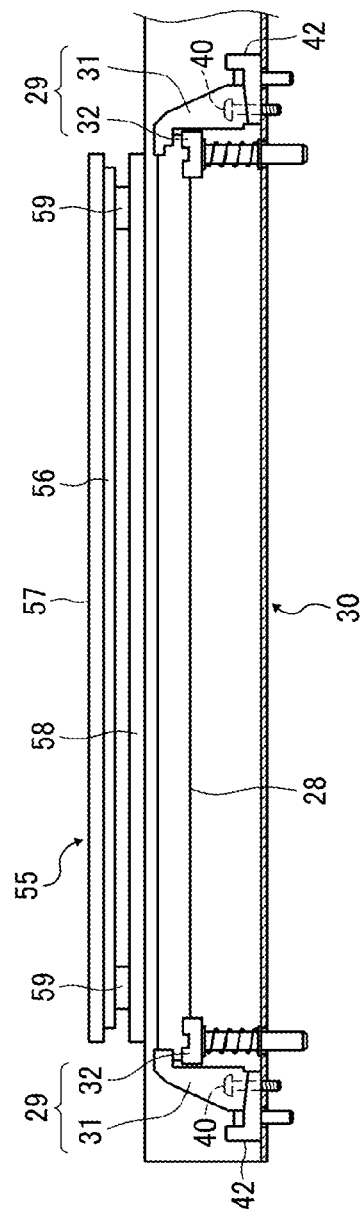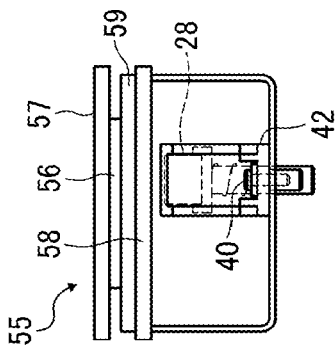

IMAGE READING DEVICE AND IMAGE FORMING APPARATUS INCORPORATING SAME

CROSS-REFERENCE TO RELATED APPLICATIONS

This patent application is based on and claims priority pursuant to 35 U.S.C. §119(a) to Japanese Patent Application Nos. 2014-047591, filed on Mar. 11, 2014, and 2014-182136, filed on Sep. 8, 2014, in the Japan Patent Office, the entire disclosure of each of which is hereby incorporated by reference herein.

BACKGROUND

1. Technical Field

Embodiments of the present disclosure relates to an image reading device that reads an image of a document, and an image forming apparatus incorporating the image reading device, such as a copier, a printer, a facsimile, a plotter, or a multifunction peripheral including at least one of the above.

2. Description of the Related Art

As an image reading device installed in an image forming apparatus or an image reading device used for inputting images into a personal computer or the like, the use of a so-called contact image sensor (CIS) in which image reading elements are arranged on the same straight line to read document images via a contact glass has been known.

A contact image sensor has a shallow focal depth. Thus, if the focal position deviates due to variations in the optical characteristics of the sensor itself or errors in the installation of the sensor, good image reading cannot be achieved. Therefore, for example, a method for adjusting the distance between the contact glass and the image sensor using a spacer or an adjusting screw has been proposed.

SUMMARY

In at least one embodiment of the present disclosure, there is provided an improved image reading device including a contact glass, an image sensor, a holder, a mount, a biasing member, and an adjusting screw. The image sensor reads image data from a document through the contact glass. The image sensor includes plural reading elements arranged on an identical line along a main scanning direction. The holder holds the image sensor. The mount mounts the holder including a screw hole. The holder is movable toward and away from the contact glass. The biasing member biases the holder toward the contact glass. The adjusting screw is attached to the screw hole to adjust a position of the holder relative to the contact glass against a biasing force of the biasing member by advancing and retreating in an axial direction of the screw hole. The biasing member and the adjusting screw are arranged on an identical straight line along the main scanning direction.

In at least one embodiment of the present disclosure, there is provided an improved image forming apparatus including an image reading device. The image reading device includes a contact glass, an image sensor, a holder, a mount, a biasing member, and an adjusting screw. The image sensor reads image data from a document through the contact glass. The image sensor includes plural reading elements arranged on an identical line along a main scanning direction. The holder holds the image sensor. The mount mounts the holder including a screw hole. The holder is movable toward and away from the contact glass. The biasing member biases the holder toward the contact glass. The adjusting screw is attached to the screw hole to adjust a position of the holder against a biasing force of the biasing member by advancing and retreating in an axial direction of the screw hole. The biasing member and the adjusting screw are arranged on an identical straight line along the main scanning direction.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein:

FIG. 14A is a plan view of an installed state of the focus adjusting jig;

FIG. 14B is a front view of the installed state of the focus adjusting jig;

FIG. 14C is a side view of an installed state of the focus adjusting jig;

Figure 1:
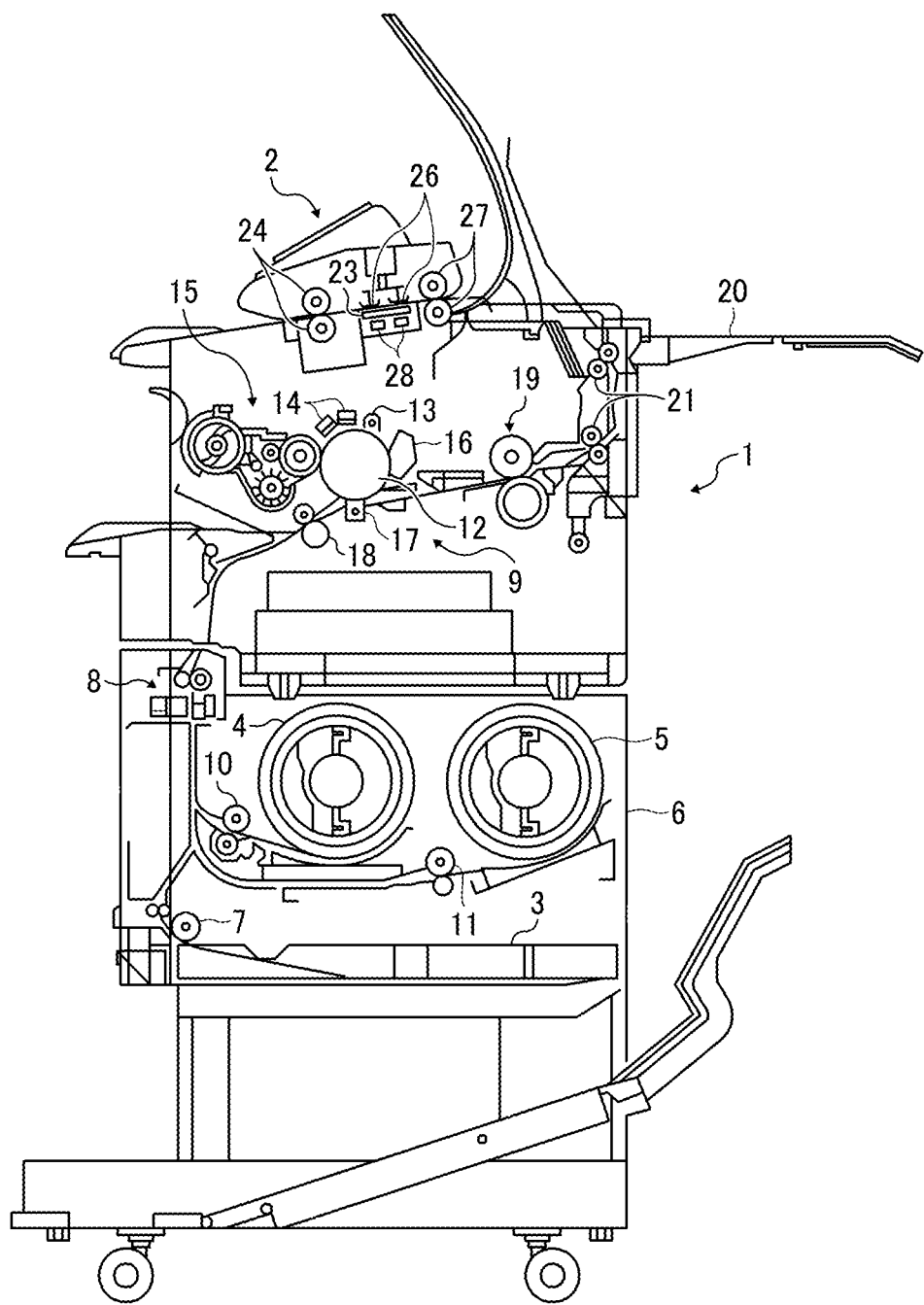
FIG. 1 is a schematic view of an image forming apparatus including an image reading device according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a schematic view of an image forming apparatus including an image reading device according to an embodiment of the present disclosure. In FIG. 1, a copier 1 is exemplified as the image forming apparatus. However, the image forming apparatus is not limited to such a copier, and may be, for example, a printer, a plotter, a facsimile, a multifunction peripheral including at least one of the foregoing machines.

As shown in FIG. 1, an image reading device 2 is installed on an upper part of the copier 1. Under the copier 1, a sheet feeding section 6 is provided, the sheet feeding section 6 including a sheet feeding cassette 3 which stores recording sheets, which are a recording medium, and sheet feeding cassettes 4 and 5 which store roll-type recording sheets. Herein, in the sheet feeding cassette 3 which stores recording sheets, typical recording sheets such as B5, A4, and B4 which are used frequently are stored. After a recording sheet is fed by a sheet feeding roller 7, it is conveyed to an image forming unit 9 thereabove by a conveyance roller 8. Further, the roll-type recording sheets stored in the sheet feeding cassettes 4 and 5 are used when a large-sized recording sheet of A3 or larger has been selected. A recording sheet of a length matching a size that was selected on an operation panel is fed by sheet feeding rollers 10 and 11 and cut by a cutter provided near the sheet feeding rollers, and then conveyed to the image forming unit 9 thereabove by the conveyance roller 8.

The image forming unit 9 includes a photoconductor drum 12 which is an image bearer, a charging device 13 that charges the photoconductor drum 12, an exposure device 14 that irradiates the photoconductor drum 12 with light modulated according to image data to form an electrostatic latent image on the photoconductor drum 12, a developing device 15 that adheres toner onto the photoconductor drum 12 to make the electrostatic latent image into a visible image, a cleaning device 16 that removes toner from the photoconductor drum 12, and the like. Further, a transfer device 17 that transfers the toner image on the photoconductor drum 12 to a recording sheet is provided at a position opposing the photoconductor drum 12. On an upstream side in a sheet conveyance direction of the transfer device 17, a timing roller 18 that feeds a recording sheet which has been conveyed by the conveyance roller 8 to a transfer part to match the image formation timing is provided. On the downstream side in the sheet conveyance direction of the transfer device 17, a fixing device 19 that fixes the transferred toner image to the recording sheet and a sheet ejection roller 21 that ejects the recording sheet after fixing to a sheet ejection tray 20 are provided.

Figure 2:
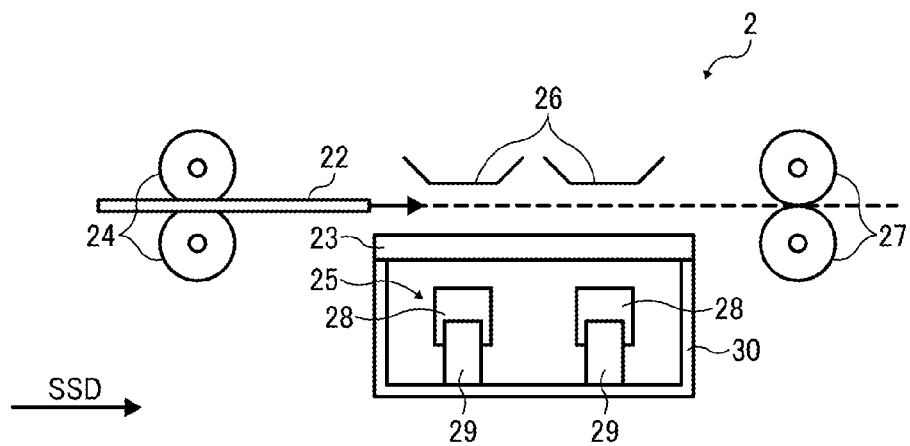
FIG. 2 is a schematic view of a configuration of the image reading device.

FIG. 2 illustrates a configuration of the image reading device 2. As shown in FIG. 2, the image reading device 2 includes, for example, a contact glass 23 provided in a document feed passage, first conveyance rollers 24 that convey a document 22 from the left side in FIG. 2 to the contact glass 23, a reading unit 25 that reads an image of the document 22 on the contact glass 23, document pressing members 26 that press the document 22 onto the contact glass 23, and second conveyance rollers 27 that eject the document 22 which has been read.

The reading unit 25 includes a plurality of contact image sensors 28 (hereinafter referred to as "CISs") in which a plurality of reading elements 100 that read an image are aligned on the same straight line along a main scanning direction which is the width direction of the document. Each CIS 28 is attached to a mount 30 that is fixed to the main body of the image reading device by holders 29.

Figure 3:
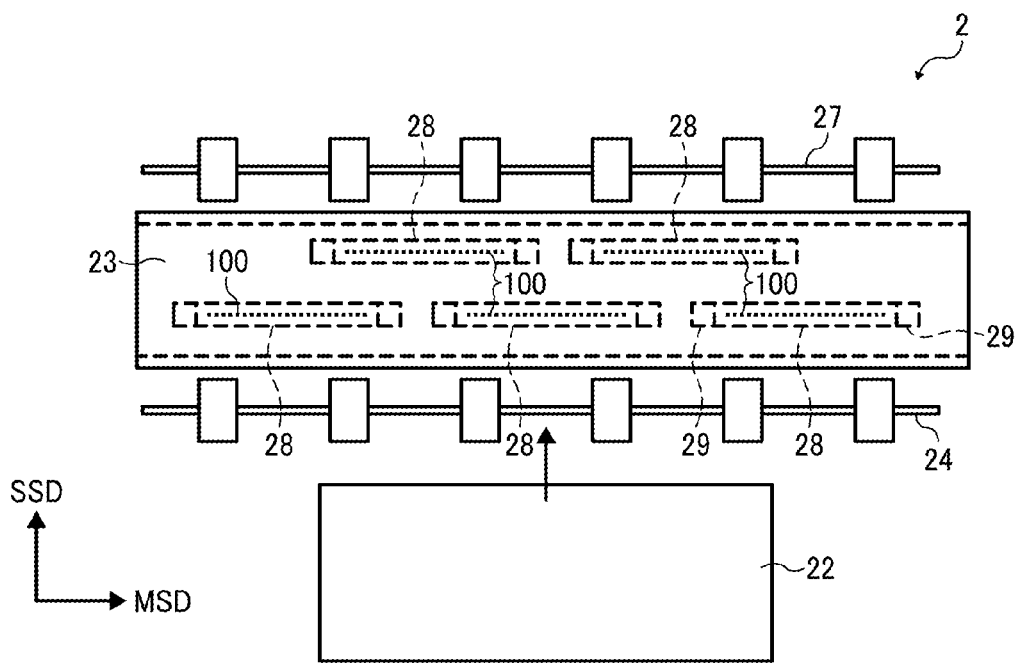
FIG. 3 is a view of an arrangement of CISs viewed from above a contact glass.

FIG. 3 is a view of an arrangement of the CISs when viewed from above the contact glass 23. As shown in FIG. 3, the plurality of CISs 28 are aligned in a staggered way. In other words, the CISs 28 are arranged so as to form linear rows along the main scanning direction indicated by arrow MSD with two rows in the sub-scanning direction indicated by arrow SSD, so that portions of the reading elements 100 in the adjacent rows of CISs 28 oppose each other in the sub-scanning direction SSD. In this way, since portions of the reading elements 100 oppose each other, the occurrence of missing images when gaps occur in the main scanning direction MSD due to variations in the CIS assembly or temperature changes is prevented.

A basic operation of the copier is described below. In the image reading device 2, when the document 22 set in a document tray is conveyed onto the contact glass 23 by the first conveyance roller 24, image data of the document 22 that was conveyed is read by the CISs 28. The images that have been read are synthesized and one line of image data is obtained. The obtained image data is processed by an image processing unit, and then transmitted to the exposure device 14 of the image forming unit 9 shown in FIG. 1.

In the image forming unit 9, first, the photoconductor drum 12 is driven to rotate, and then a surface of the rotating photoconductor drum 12 is charged to a uniform high potential by the charging device 13. The exposure device 14 irradiates the photoconductor drum 12 with light modulated according to the image data transmitted from the image reading device 2, and thereby an electrostatic latent image is formed on the photoconductor drum 12. Toner is then supplied to the electrostatic latent image by the developing device 15, and a toner image (visible image) is formed.

Meanwhile, a recording sheet of a size selected from one of the sheet feeding cassettes 3 to 5 of the sheet feeding section 6 to match the above-described image formation is fed and conveyed to the transfer part of the transfer device 17 at a prescribed timing by the conveyance roller 8 and the timing roller 18. An image is then transferred by the transfer device 17 onto the recording sheet that has been conveyed to the transfer part.

After image transfer, the recording sheet is conveyed to the fixing device 19, where the image on the recording sheet is fixed by heat or pressure. After fixing, the recording sheet is ejected to the sheet ejection tray 20 by the sheet ejection roller 21. Further, any toner or powder remaining on the photoconductor drum 12 after image transfer is removed by the cleaning device 16.

The above-described configuration and operation are the basic configuration and operation of the copier shown in FIG. 1 and the image reading device shown in FIG. 2.

Next, a holder assembly and a position adjustment assembly of the CISs in the above-described image reading device are described below. The holder assembly and position adjustment assembly of each CIS have the same configuration, and thus the holder assembly and position adjustment assembly of a single CIS are described as an example.

Figure 4:
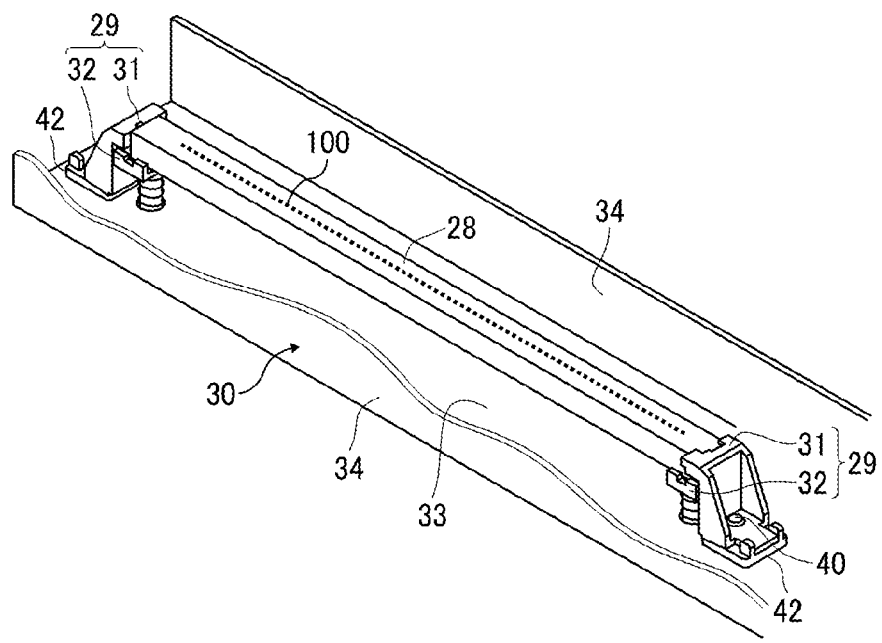
FIG. 4 is a perspective view of a holder assembly and a position adjustment assembly of a CIS.
Figure 5:
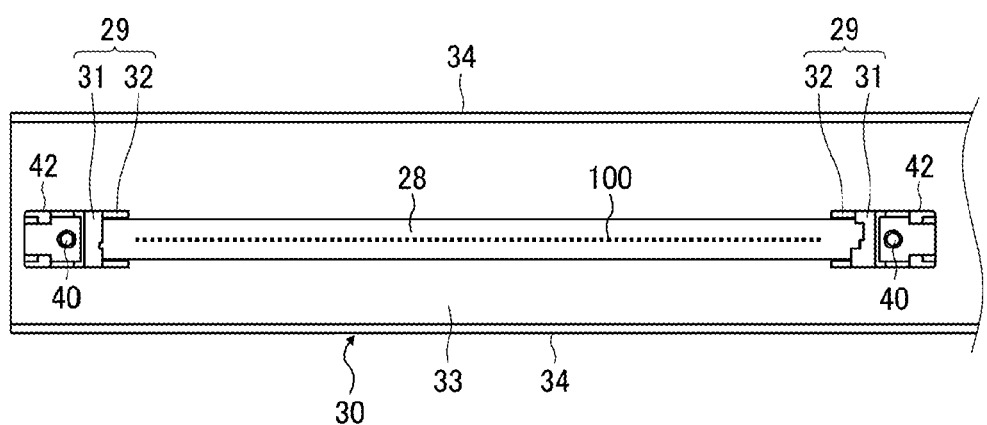
FIG. 5 is a plan view of the holder assembly and the position adjustment assembly of the CIS.
Figure 6:
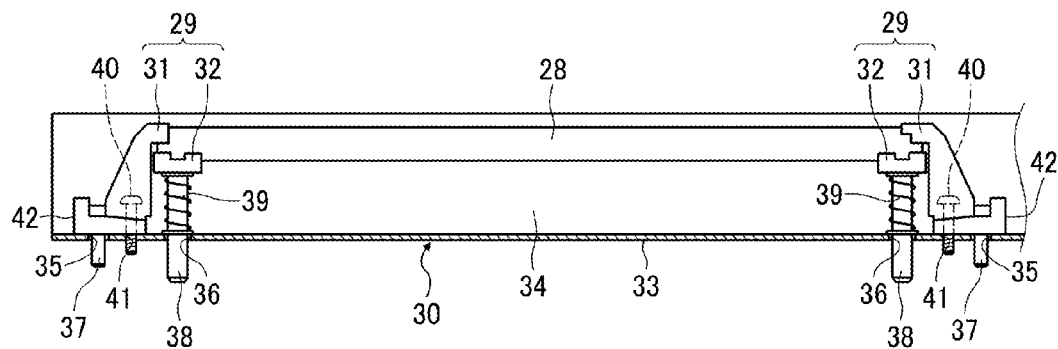
FIG. 6 is a front view of the holder assembly and the position adjustment assembly of the CIS.
Figure 7:
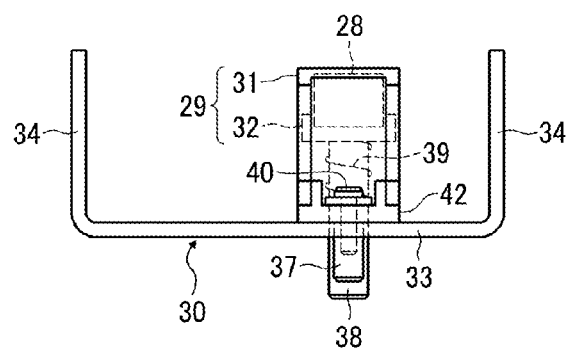
FIG. 7 is a side view of the holder assembly and the position adjustment assembly of the CIS.

FIG. 4 is a perspective view of a holder assembly and a position adjustment assembly of a CIS. FIG. 5 is a plan view thereof, FIG. 6 is a front view thereof, and FIG. 7 is a side view thereof. Each CIS 28 is attached to a mount 30 via a pair of holders 29 disposed at both ends thereof in the lengthwise direction. Each holder 29 includes an upper holder 31 that holds the upper side of the CIS 28 and a lower holder 32 that holds the lower side of the CIS 28. The mount 30 includes a bottom plate 33 to which the upper holder 31 and the lower holder 32 are attached and a side plate 34 provided orthogonally relative to the bottom plate 33.

As shown in FIG. 6, the upper holder 31 and the lower holder 32 include shafts 37 and 38, respectively. The shafts 37 and 38 are individually inserted into respective insertion holes 35 and 36, which serve as insertion portions provided on the bottom plate 33 of the mount 30. The shafts 37 and 38 can move in the up-down direction relative to the insertion holes 35 and 36 (a direction toward/away from the contact glass 23) in a state in which they are inserted into the insertion holes 35 and 36.

A coil spring 39 which serves as a biasing member is mounted onto the shaft 38 of the lower holder 32. The lower holder 32 is biased upwards relative to the bottom plate 33 of the mount 30 (in a direction toward the contact glass 23) by the coil spring 39. Thereby, in a state in which the CIS 28 is held by the upper holder 31 and the lower holder 32, these members integrally receive the biasing force of the coil spring 39 so as to be biased upwards. As the biasing member, in addition to a coil spring, a biasing member such as a leaf spring or rubber can also be used.

A screw hole 41 in which female threads are formed is provided in the mount 30, and an adjusting screw 40 for adjusting the position in the movement direction of the upper holder 31 and the lower holder 32 is attached to the screw hole 41. The upper holder 31 can be pressed against the biasing force of the coil spring 39 by the adjusting screw 40, and thereby the upper holder 31 is fastened at a desired position (height) relative to the mount 30. Simultaneously, the positions of the holder 32 and the CIS 28 are also indirectly fixed with the adjusting screw 40.

Further, a holder support 42 that supports a bottom face of the upper holder 31 is inserted between the upper holder 31 and the bottom plate 33 of the mount 30.

Figure 8:
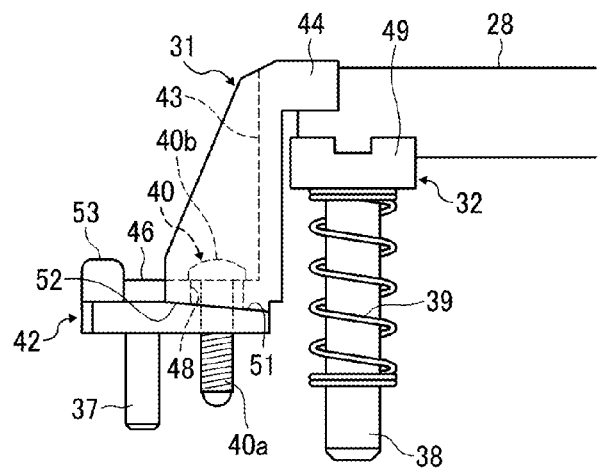
FIG. 8 is a front view of an upper holder, a lower holder, and a holder support.
Figure 9:
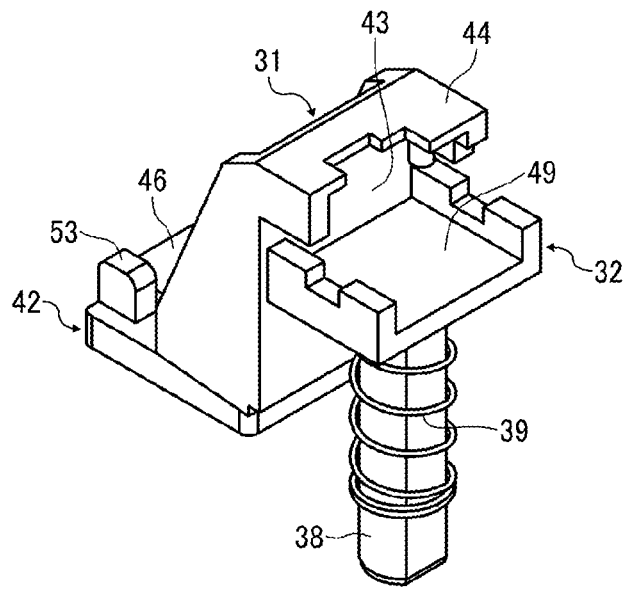
FIG. 9 is a perspective view of the upper holder, the lower holder, and the holder support viewed from a diagonally upward direction.
Figure 10:
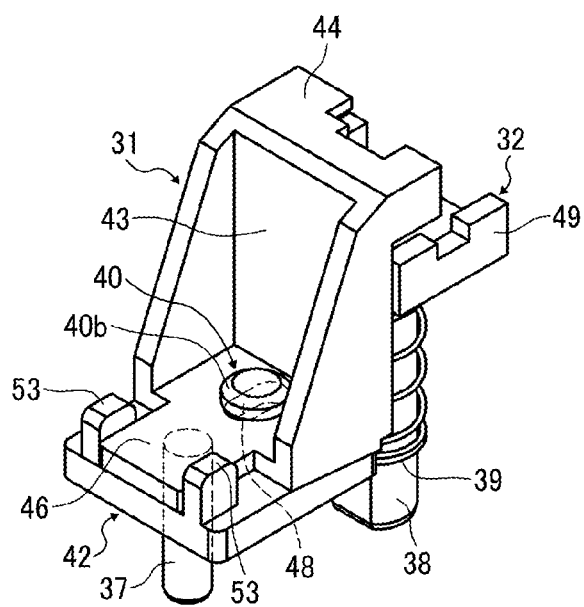
FIG. 10 is a perspective view of the upper holder, the lower holder, and the holder support viewed from a different diagonally upward direction.
Figure 11:
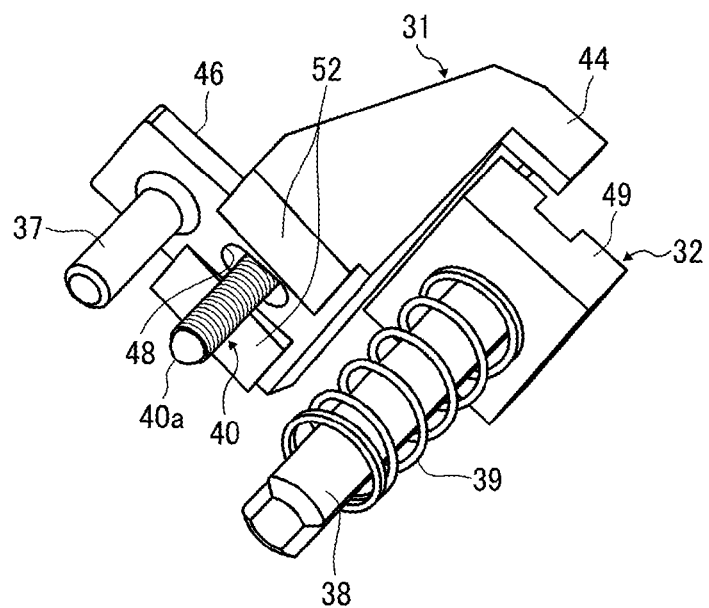
FIG. 11 is a perspective view of the upper holder and the lower holder viewed from a diagonally downward direction.
Figure 12:
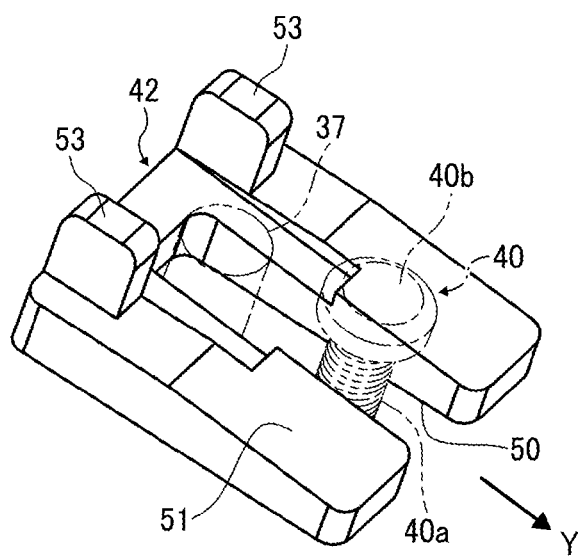
FIG. 12 is a perspective view of the holder support viewed from a diagonally upward direction.

The configurations of the upper holder 31, the lower holder 32, and the holder support 42 (these three members are collectively referred to as the "upper holder, etc." hereinafter) are described in detail below. FIG. 8 is a front view of the upper holder 31, etc. FIG. 9 is a perspective view of the upper holder 31, etc. when viewed from a diagonally upward direction. FIG. 10 is a perspective view of the upper holder 31, etc. when viewed from a different diagonally upward direction. FIG. 11 is a perspective view of the upper holder 31 and the lower holder 32 when viewed from a diagonally downward direction. FIG. 12 is a perspective view of the holder support 42 when viewed from a diagonally upward direction. In FIGS. 8 to 12, the upper holder 31, etc. disposed on one end side of the CIS 28 are illustrated, but the upper holder 31, etc. disposed on the other end side of the CIS 28 have basically the same configuration. Thus, in order to avoid overlapping explanations, the configuration of the upper holder 31, etc. of only one side is described.

As shown in FIG. 8, the upper holder 31 includes a vertical portion 43 that extends in the vertical direction relative to the lengthwise direction of the CIS 28, a holding portion 44 provided to protrude to the CIS 28 side from the top of the vertical portion 43, and a horizontal portion 46 that extends to the outside in the lengthwise direction of the CIS 28 from the bottom of the vertical portion 43.

The holding portion 44 contacts a top face, a front face (a face on a front side in FIG. 8), and a back face (a face on a back side in FIG. 8) of the CIS 28 to hold the CIS 28. The shaft 37 is provided to extend downwards on a bottom face of the horizontal portion 46. Also, a screw insertion hole 48 into which a screw portion 40a of the adjusting screw 40 is inserted is provided in the horizontal portion 46. The screw insertion hole 48 is formed to be long in the main scanning direction (the lengthwise direction of the CIS 28), but the width in the sub-scanning direction is formed to be smaller than the width of a head portion 40b of the adjusting screw 40 (refer to FIG. 10). Therefore, the head portion 40b of the adjusting screw 40 does not pass through the screw insertion hole 48.

The lower holder 32 is constituted by a holding portion 49 that contacts the bottom face, the front face (the face on the front side in FIG. 8), and the back face (the face on the back side in FIG. 8) of the CIS 28 to hold the CIS 28, and the shaft 38 provided so as to extend downwards from the bottom face of the holding portion 49. A top end of the coil spring 39 contacts the bottom face of the holding portion 49, and the bottom end of the coil spring 39 contacts a top face of the bottom plate 33 of the mount 30 (refer to FIG. 6). Thus, the coil spring 39 is held in a compressed state between the bottom face of the holding portion 49 and the top face of the mount 30.

As shown in FIG. 12, a slit 50 into which the screw portion 40a of the adjusting screw 40 and the shaft 37 of the upper holder 31 can be inserted is formed in the holder support 42. The slit 50 is formed from near the back end side in an insertion direction Y of the holder support 42 to the distal end in the insertion direction Y of the holder support 42. The top face on the distal end side in the insertion direction Y of the holder support 42 is formed into an inclined face 51 that inclines relative to the horizontal direction. Thereby, the holder support 42 is formed such that its height tapers toward the distal end in the insertion direction Y. The bottom face of the upper holder 31 (horizontal portion 46) which opposes the inclined face 51 is also formed into an inclined face 52 that protrudes downwards toward the insertion direction Y of the holder support 42 in order to correspond to the inclined face 51 (refer to FIGS. 8 and 11). The inclination angles relative to the horizontal direction of the inclined face 52 of the upper holder 31 and the inclined face 51 of the holder support 42 are set to the same angle. A pair of protrusions 53 which serve as positional shift stoppers are provided so as to protrude upwards on the top face at the opposite end in the insertion direction Y of the holder support 42.

Figure 13A:
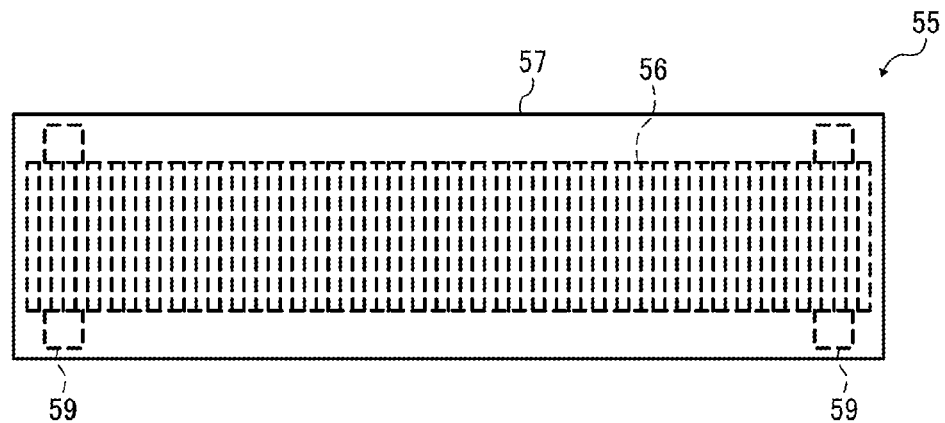
FIG. 13A is a plan view of a focus adjusting jig.
Figure 13B:
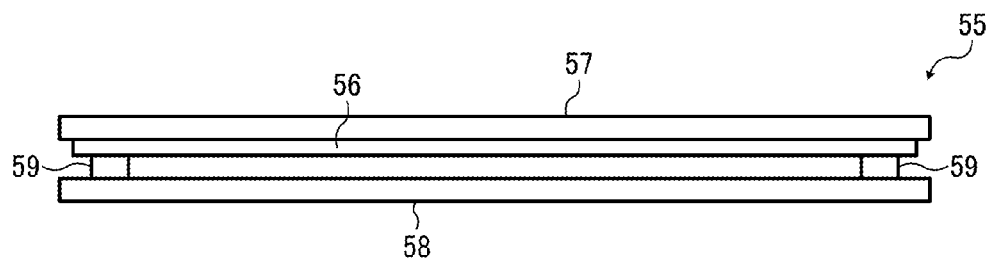
FIG. 13B is a front view of the focus adjusting jig of FIG. 13A.
Figure 13C:
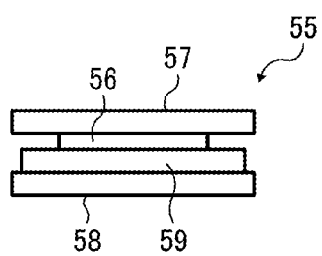
FIG. 13C is a side view of the focus adjusting jig of FIG. 13A.

Next, a focus adjusting method of the CISs is described. FIGS. 13A to 13C illustrate a configuration of a focus adjusting jig. FIG. 13A is a plan view, FIG. 13B is a front view, and FIG. 13C is a side view of the focus adjusting jig. As shown in FIGS. 13A to 13C, a focus adjusting jig 55 is constituted by a chart plate 57 to which a test chart 56 such as a multiple line chart of a predetermined frequency is affixed, a glass plate 58, and spacers 59. The chart plate 57 is fixed onto the glass plate 58 with the spacers 59 interposed therebetween.

FIGS. 14A to 14C illustrate a state in which the focus adjusting jig 55 is installed. FIG. 14A is a plan view, FIG. 14B is a front view, and FIG. 14C is a side view of the installed state of the focus adjusting jig 55. As shown in FIG. 14, the focus adjusting jig 55 is disposed above the CIS 28 which executes focus adjustment. Specifically, the focus adjusting jig 55 is disposed on the mount 30 so that straight lines which are aligned at an equal pitch of the test chart 56 face the sub-scanning direction. In this state, by rotating the adjusting screw 40 from above to cause it to advance/retreat relative to the screw hole 41, the upper holder 31, the lower holder 32, and the CIS 28 held by the holders 31 and 32 can be moved up and down to adjust the focal position. In a state in which the desired focal position has been reached based on an image signal of the test chart 56 obtained from the CIS 28, the holder support 42 is inserted between the upper holder 31 and the mount 30. Thus, the upper holder 31 is supported by the holder support 42, and the CIS 28 is held in a desired focal position.

Figure 15:
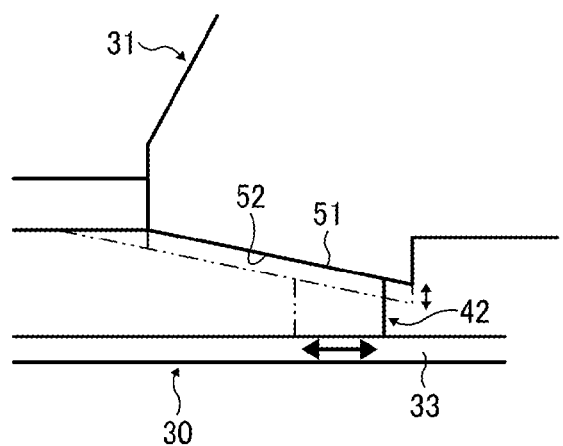
FIG. 15 is an enlarged view of a state in which the holder support is inserted between the upper holder and a mount.

The height of the gap between the upper holder 31 and the mount 30 changes depending on the position of the upper holder 31. However, since the top face of the holder support 42 and the bottom face of the upper holder 31 are formed into the inclined faces 51 and 52, the holder support 42 can be inserted even if the height of the gap changes. In other words, as shown in FIG. 15, the insertion position of the holder support 42 is changed according to the height of the gap between the upper holder 31 and the mount 30, and thereby the holder support 42 can be interposed between the upper holder 31 and the mount 30 without any gaps.

In a state in which the holder support 42 is inserted, the pair of protrusions 53 provided on the holder support 42 are disposed on both sides of the horizontal portion 46 of the upper holder 31. Thereby, the protrusions 53 and the horizontal portion 46 are disposed in a state in which they can interfere with each other, and thus positional shifts in a direction which intersects with the insertion direction of the holder support 42 are prevented.

Figure 16:
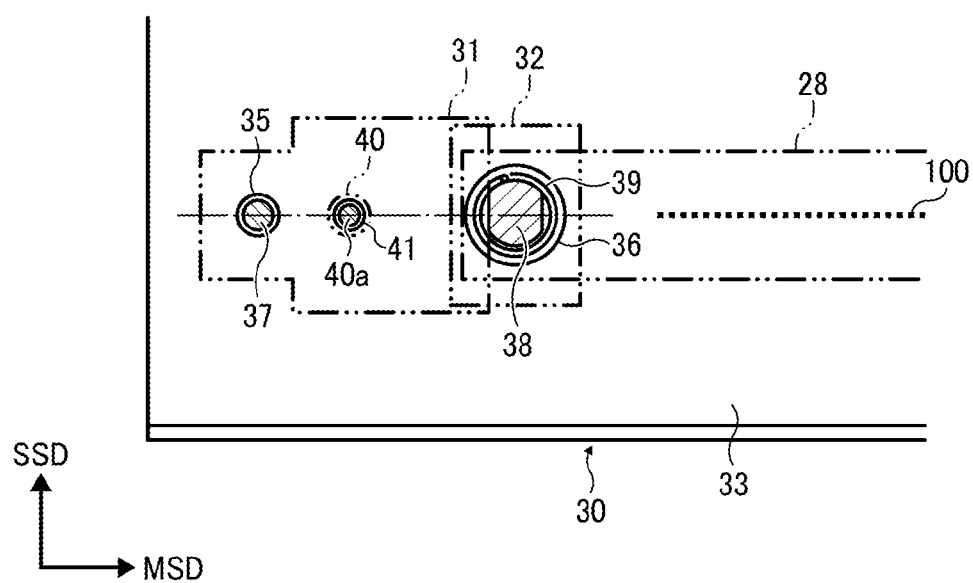
FIG. 16 is a plan view of an arrangement of a coil spring, an adjusting screw, and a shaft of each holder.
Figure 18:
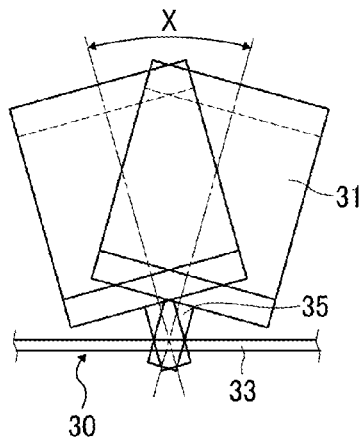
FIG. 18 is a schematic view of a state in which the top holder tips over in a sub-scanning direction.

Herein, in the present embodiment, in order to inhibit the upper holder 31 and the lower holder 32 from tipping over in the sub-scanning direction (direction indicated by arrow X) as shown in FIG. 18, the coil spring 39 and the adjusting screw 40 are arranged on the same straight line along the main scanning direction as shown in FIG. 16.

Figure 17A:
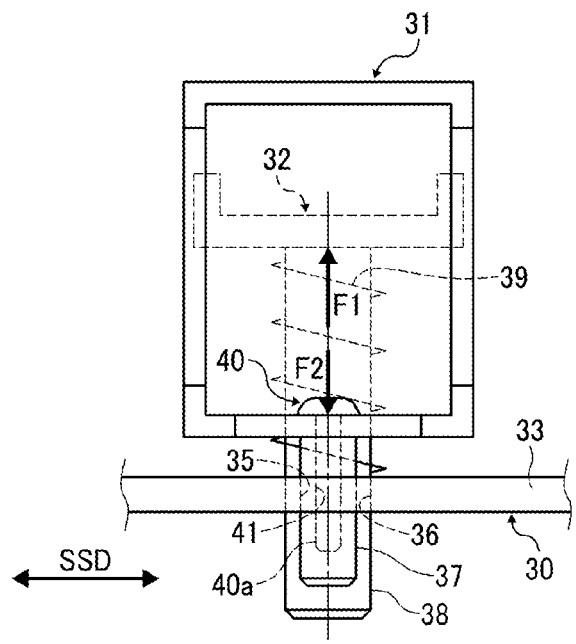
FIG. 17A is a side view of a configuration in which the coil spring and the adjusting screw are arranged on the same straight line along a main scanning direction.
Figure 17B:
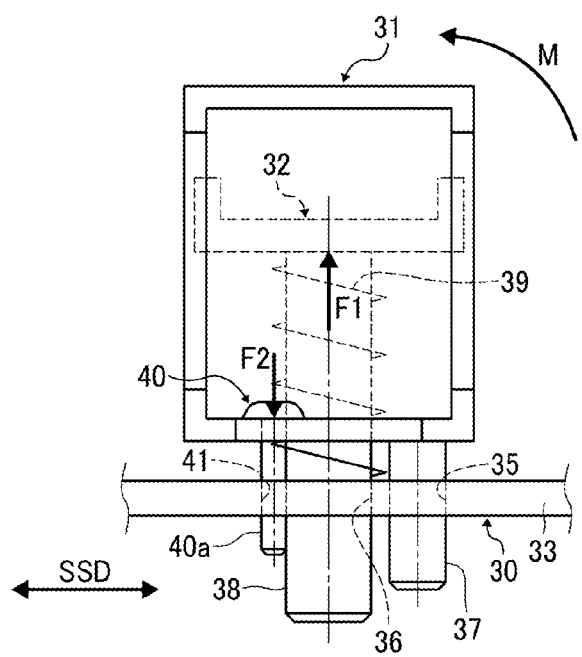
FIG. 17B is a side view of a configuration in which the coil spring and the adjusting screw are not arranged on the same straight line.

FIG. 17A is a side view when viewed from the main scanning direction of a configuration in which the coil spring 39 and the adjusting screw 40 are arranged on the same straight line along the main scanning direction. FIG. 17B is a side view when viewed from the main scanning direction of a configuration in which these members are not arranged on the same straight line. As shown in FIG. 17B, in the example in which the coil spring 39 and the adjusting screw 40 are not arranged on the same straight line, an upwards biasing force F1 by the coil spring 39 and a downwards pressing force F2 by the adjusting screw 40 act at different positions in the sub-scanning direction indicated by arrow SSD. As a result, rotational momentum M is generated on the upper holder 31 and the lower holder 32, and thus a situation is created in which the upper holder 31 and the lower holder 32 can easily tip over in the sub-scanning direction SSD.

By contrast, as shown in FIG. 17A, in the example in which the coil spring 39 and the adjusting screw 40 are arranged on the same straight line along the main scanning direction, the biasing force F1 by the coil spring 39 and the pressing force F2 by the adjusting screw 40 do not deviate from each other in the sub-scanning direction indicated by arrow SSD. Accordingly, rotational momentum M like that mentioned above is not generated. Thus, in the example in which the coil spring 39 and the screw hole 41 are arranged on the same straight line along the main scanning direction, the upper holder 31 and the lower holder 32 are inhibited from tipping over in the sub-scanning direction SSD.

In this way, in the present embodiment, by arranging the coil spring 39 and the adjusting screw 40 on the same straight line along the main scanning direction, the upper holder 31 and the lower holder 32 can be inhibited from tipping over in the sub-scanning direction. As a result, the occurrence of skewed images caused by tilting of the CIS 28 in the sub-scanning direction can be suppressed. Further, by inhibiting the shafts 37 and 38 of the upper holder 31 and the lower holder 32 from tipping over in the sub-scanning direction, the shafts 37 and 38 do not easily catch on the insertion holes 35 and 36, and thus the focus adjusting operation can be executed smoothly.

Also, in the present embodiment, the insertion holes 35 and 36 into which the shafts 37 and 38 of the upper holder 31 and the lower holder 32 are inserted and the screw hole 41 to which the adjusting screw 40 is attached are arranged on the same straight line in the main scanning direction MSD (refer to FIG. 16). Accordingly, the shafts 37 and 38 of the upper holder 31 and the lower holder 32 are arranged on the same straight line as the biasing force F1 of the coil spring 39 and the pressing force F2 of the adjusting screw 40 which act in the movement direction of the shafts 37 and 38, and thus the upper holder 31 and the lower holder 32 can easily move in the axial direction.

In addition, in the present embodiment, by inserting the holder support 42 between the upper holder 31 and the mount 30 so that the upper holder 31 is supported by the holder support 42, the upper holder 31 can be restricted from tipping over in the sub-scanning direction. Thereby, tilting of the CIS 28 in the sub-scanning direction can be reliably suppressed, and the reliability of the image quality can also be enhanced.

Incidentally, an image output device, a device installation mount, and the like are often disposed below the image reading device. Thus, in order to perform adjustment operations from below the image reading device, the devices and the like arranged below the image reading device must be removed to secure a work space, and this is troublesome and requires a considerable amount of time. Therefore, it is preferable to enable adjustment operations to be performed from above, but when providing a holding assembly, a position adjustment assembly, and the like above the CIS, they must be provided so that they do not obstruct the image reading.

Thus, in the present embodiment, the upper holder 31, the lower holder 32, and the adjusting screw 40 are disposed at positions at which they do not overlap with the reading elements 100 arranged on the reading face side of the CIS 28, and the adjusting screw 40 is attached to the screw hole 41 from above. Thereby, the image reading is not obstructed by the upper holder 31, the lower holder 32, and the adjusting screw 40. Also, since the adjusting screw 40 is disposed at a position at which it does not overlap with the housing of the CIS 28, the adjusting screw 40 can be rotated from above with a tool such as a driver. Thereby, adjustment operations can be easily performed, and the workability is greatly improved.

Next, another embodiment of the present invention is described. The following explanations will focus on the points of difference from the above-described embodiment, and redundant portions will be omitted.

Figure 19:
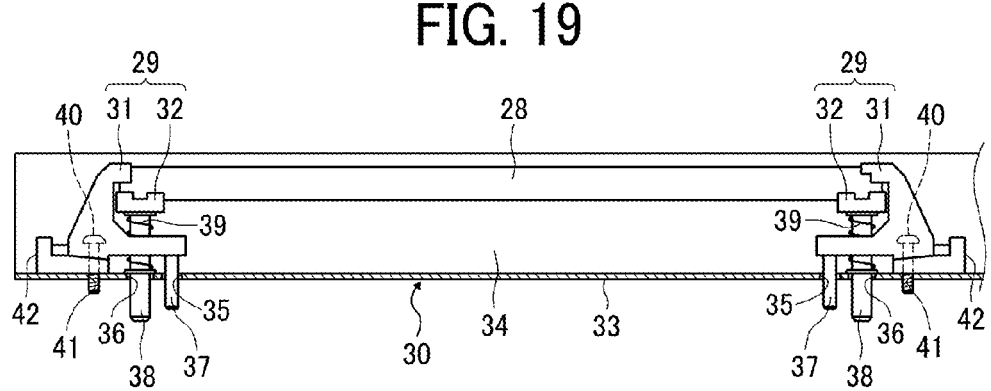
FIG. 19 is a front view of a holder assembly and a position adjustment assembly of a CIS according to another embodiment of the present invention.
Figure 20:
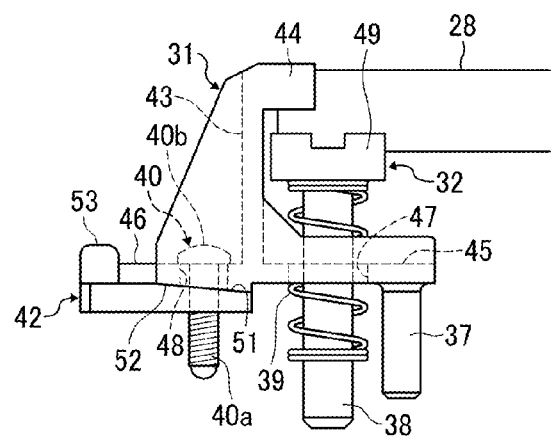
FIG. 20 is a front view of the upper holder, the lower holder, and the holder support.
Figure 21:
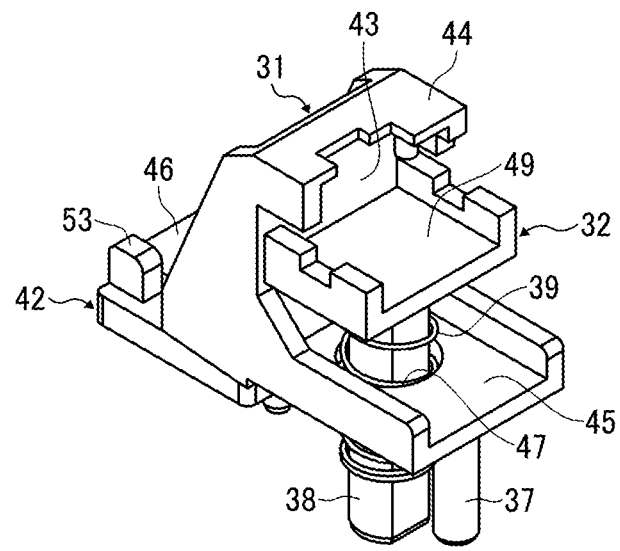
FIG. 21 is a perspective view of the upper holder, the lower holder, and the holder support when viewed from a diagonally upward direction.
Figure 22:
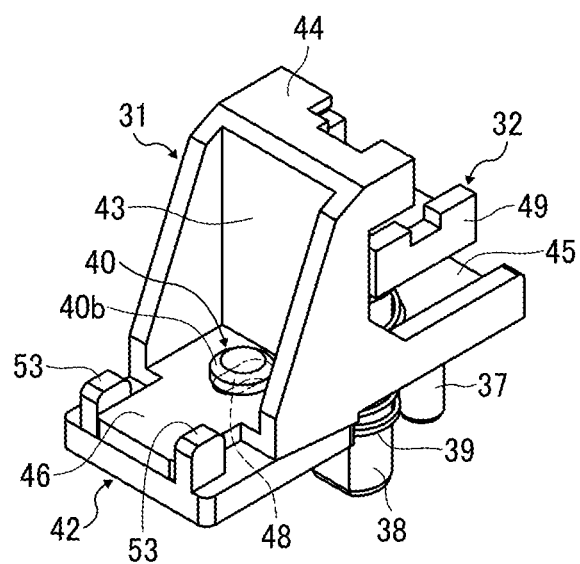
FIG. 22 is a perspective view of the upper holder, the lower holder, and the holder support when viewed from a different diagonally upward direction.
Figure 23:
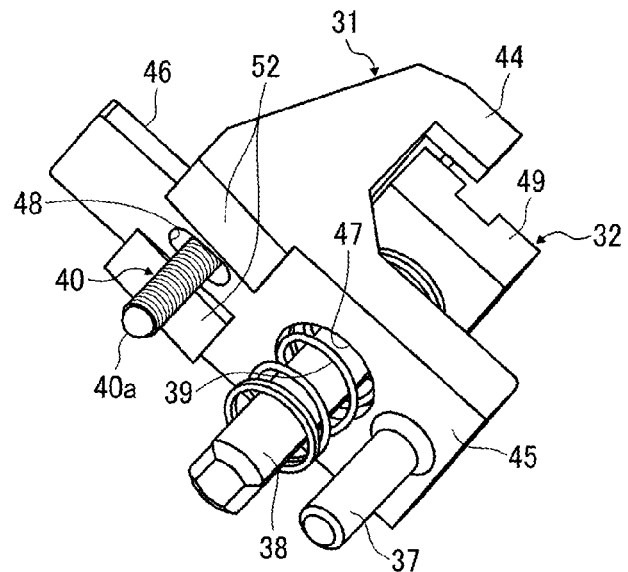
FIG. 23 is a perspective view of the upper holder and the lower holder when viewed from a diagonally downward direction.

FIG. 19 is a front view of a holder assembly and a position adjustment assembly of a CIS according to another embodiment of the present invention. A detailed configuration of this embodiment is shown in FIGS. 20 to 24.

In the present embodiment, the configuration of the upper holder 31 is different compared to the above-described embodiment. In the above-described embodiment, the shaft 37 of the upper holder 31 is disposed more toward the outside in the lengthwise direction of the CIS 28 than the adjusting screw 40 (refer to FIG. 6). In contrast, in the present embodiment, as shown in FIG. 19, the shaft 37 of the upper holder 31 is disposed more toward the inside in the lengthwise direction of the CIS 28 than the shaft 38 of the lower holder 32. In accordance with this, the position of the insertion hole 35 into which the shaft 37 is inserted is also different. In other words, in the present embodiment, the insertion hole 35 is disposed more toward the inside in the lengthwise direction of the CIS 28 than the insertion hole 36 into which the shaft 38 of the lower holder 32 is inserted.

As shown in FIGS. 20 to 23, the upper holder 31 includes the vertical portion 43 that extends in the vertical direction relative to the lengthwise direction of the CIS 28, the holding portion 44 provided to protrude to the CIS 28 side from the top of the vertical portion 43, a first horizontal portion 46 that extends to the outside in the lengthwise direction of the CIS 28 from the bottom of the vertical portion 43, as well as a second horizontal portion 45 that extends in the opposite direction of the first horizontal portion 46. The shaft 37 is provided to extend downwards on the bottom face of the second horizontal portion 45.

A shaft insertion hole 47 into which the shaft 38 of the lower holder 32 is inserted is provided between a portion at which the second horizontal portion 45 is connected to the shaft 37 and a portion at which the second horizontal portion 45 is connected to the vertical portion 43. In a state in which the shaft 38 of the lower holder 32 is inserted into the shaft insertion hole 47, it can move in the up-down direction relative to the shaft insertion hole 47. The coil spring 39 which is mounted on the shaft 38 of the lower holder 32 is also disposed in a state in which it is inserted into the shaft insertion hole 47 together with the shaft 38. The top end of the coil spring 39 contacts the bottom face of the holding portion 49 of the lower holder 32, and the bottom end of the coil spring 39 contacts the top face of the bottom plate 33 of the mount 30 (refer to FIG. 19). Thus, the coil spring 39 is held in a compressed state between the bottom face of the holding portion 49 and the top face of the mount 30.

Figure 24:
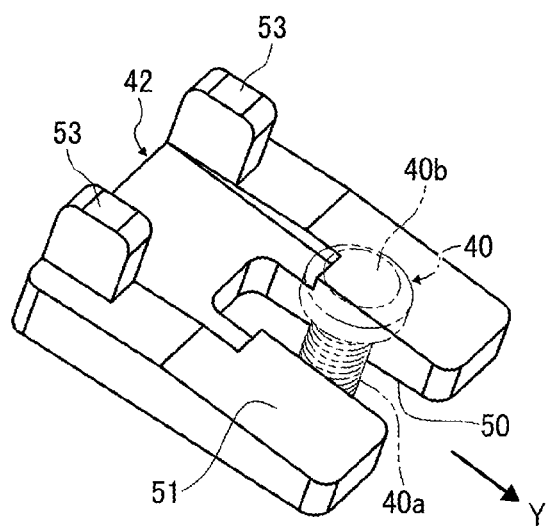
FIG. 24 is a perspective view of the holder support when viewed from a diagonally upward direction.

As shown in FIG. 24, the slit 50 into which the screw portion 40a of the adjusting screw 40 can be inserted is formed in the holder support 42. In the present embodiment, the slit 50 is formed to be shorter compared to that in the above-described embodiment (refer to FIG. 12). In other words, in the present embodiment, the shaft 37 of the upper holder 31 is not inserted in the slit 50, which is different from the above-described embodiment. Thus, it is not necessary to secure a space for inserting the shaft 37 of the upper holder 31, and therefore the slit 50 is formed to be shorter.

Figure 25:
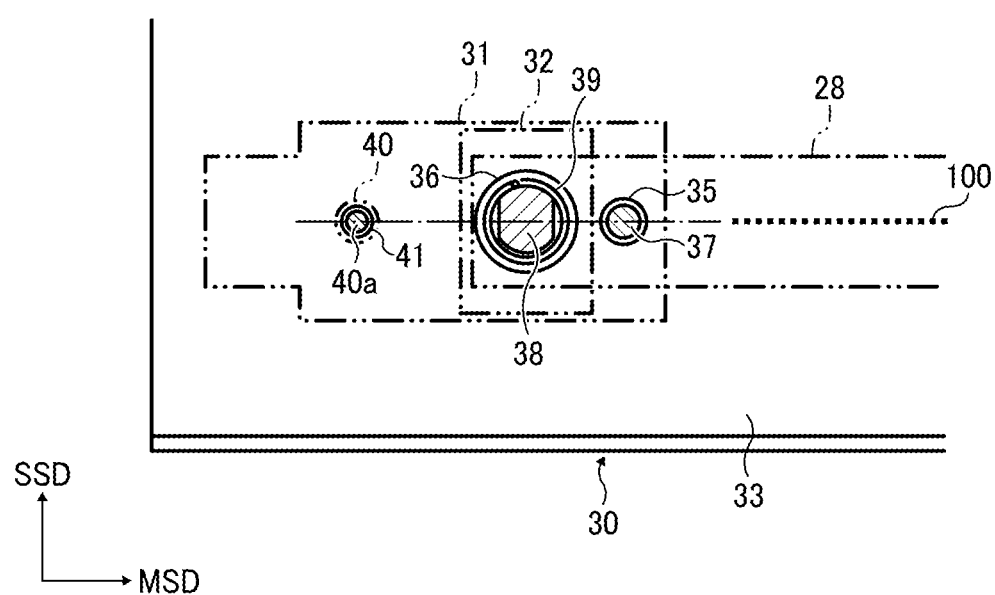
FIG. 25 is a plan view of an arrangement of the coil spring, the adjusting screw, and the shaft of each holder.

FIG. 25 is a plan view of an arrangement of the coil spring, the adjusting screw, and the shaft of each holder. As shown in FIG. 25, similarly to the above-described embodiment, the coil spring 39 and the adjusting screw 40 are arranged on the same straight line in the main scanning direction MSD in the present embodiment as well. Thereby, the upper holder 31 and the lower holder 32 can be inhibited from tipping over in the sub-scanning direction SSD, and the occurrence of skewed images caused by tilting of the CIS 28 in the sub-scanning direction SSD can be suppressed. Further, by inhibiting the shafts 37 and 38 of the upper holder 31 and the lower holder 32 from tipping over in the sub-scanning direction SSD, the shafts 37 and 38 do not easily catch on the insertion holes 35 and 36, and thus the focus adjusting operation can be executed smoothly.

In addition, similarly to the above-described embodiment, the insertion holes 35 and 36 into which the shafts 37 and 38 of the upper holder 31 and the lower holder 32 are inserted and the screw hole 41 to which the adjusting screw 40 is attached are arranged on the same straight line in the main scanning direction MSD. Thereby, the shafts 37 and 38 of the upper holder 31 and the lower holder 32 are arranged on the same straight line as the biasing force F1 of the coil spring 39 and the pressing force F2 of the adjusting screw 40 which act in the movement direction of the shafts 37 and 38, and thus the upper holder 31 and the lower holder 32 can easily move in the axial direction.

Moreover, the present embodiment can be made more compact compared to the above-described embodiment. One feature that makes this possible is that the shaft 37 of the upper holder 31 is disposed so as to overlap with a non-reading face side (underside) on the opposite side of the reading face side of the CIS 28 on which the reading elements 100 are arranged as shown in FIG. 25. Hereinafter, the characteristic portions of the present embodiment are described while comparing the configuration of the present embodiment with the above-described embodiment.

Figure 26A:
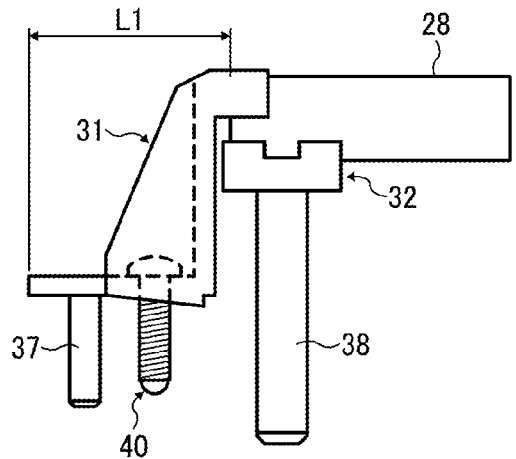
FIG. 26A is a schematic view of a configuration in which the shaft of the upper holder is arranged in a position that does not overlap with the CIS.
Figure 26B:
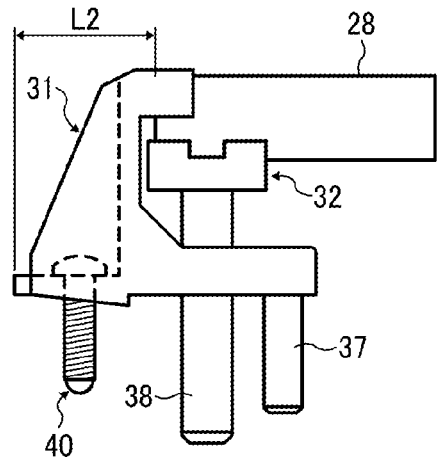
FIG. 26B is a schematic view of a configuration in which the shaft of the upper holder is arranged in a position that overlaps with the CIS.

FIG. 26A illustrates a configuration in which the shaft 37 of the upper holder 31 is arranged in a position that does not overlap with the CIS 28, and FIG. 26B, in comparison with FIG. 26A, illustrates a configuration in which the shaft 37 of the upper holder 31 is arranged in a position that overlaps with the CIS 28. As shown in FIG. 26A, in the configuration in which the shaft 37 of the upper holder 31 is arranged in a position that does not overlap with the CIS 28, the shaft 37 is disposed more toward the outside than the end in the lengthwise direction of the CIS 28. Thus, a length L1 of a portion of the upper holder 31 that protrudes toward the outside from the end in the lengthwise direction of the CIS 28 is long. In contrast, as shown in FIG. 26B, in the configuration in which the shaft 37 of the upper holder 31 is arranged in a position that overlaps with the CIS 28, the shaft 37 is disposed more toward the inside than the end in the lengthwise direction of the CIS 28. Thus, a length L2 of the portion of the upper holder 31 that protrudes toward the outside can be shortened.

In this way, by arranging the shaft 37 of the upper holder 31 so that it overlaps with a non-reading face side (underside) of the CIS 28, since the length of the portion of the upper holder 31 that protrudes toward the outside can be shortened, the CIS holder assembly can be made compact, and this in turn contributes to reducing the size of the overall reading device.

Figure 27:
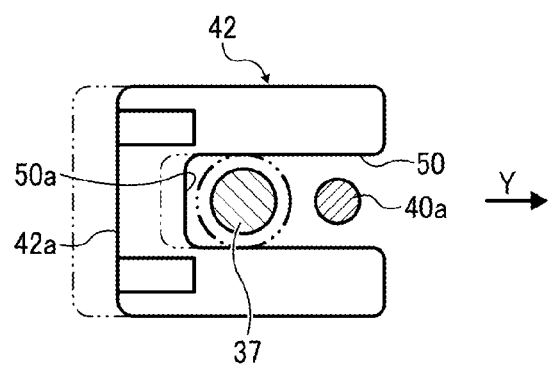
FIG. 27 is a plan view of the holder support according to the above-described embodiment when viewed from above.

FIG. 27 is a plan view of the holder support 42 according to the above-described embodiment when viewed from above. In the configuration of the above-described embodiment, the shaft 37 of the upper holder 31 is inserted in the slit 50 of the holder support 42. In such an embodiment, if the shaft 37 of the upper holder 31 is thickened in order to increase the strength of the shaft 37, the clearance between the outer peripheral face of the shaft 37 and a rear wall surface 50a of the slit 50 decreases, and thus interference may occur therebetween and movement of the holder support 42 in the insertion direction Y may be restricted. In order to avoid this, it is conceivable to shift the position of the rear wall surface 50a of the slit 50 further towards the rear (left side in FIG. 27) as shown by the dash-dot-dot line in FIG. 27 to lengthen the slit 50. However, this would cause the width between the rear wall surface 50a of the slit 50 and a rear end surface 42a of the holder support 42 to decrease, and thus the strength of this portion would decline. Therefore, in order to secure the necessary strength, the position of the rear end surface 42a of the holder support 42 must also be shifted toward the rear as shown by the dash-dot-dot line in FIG. 27. However, in this case, the size of the holder support 42 in the insertion direction Y would increase.

In contrast, in the present embodiment, since the shaft 37 of the upper holder 31 and the holder support 42 are disposed on opposite sides sandwiching the shaft 38 of the lower holder 32, the shaft 37 of the upper holder 31 is not inserted in the slit 50 of the holder support 42. Thus, even if the shaft 37 of the upper holder 31 is thickened, it would not interfere with the rear wall surface 50a of the slit 50, and the movement of the holder support 42 would not be restricted. Therefore, it is not necessary to increase the size of the holder support 42 in the insertion direction Y.

In this way, according to the configuration of the present embodiment, by arranging the shaft 37 of the upper holder 31 and the holder support 42 at positions where they do not easily interfere with each other, increases in the size of the holder support 42 can be avoided even if the shaft 37 of the upper holder 31 is thickened, and this contributes to reducing the size of the overall reading device.

Further, similarly to the above-described embodiment, in the present embodiment as well, by rotating the adjusting screw 40 to cause it to advance/retreat relative to the screw hole 41, the upper holder 31, the lower holder 32, and the CIS 28 held by the holders 31 and 32 can be moved up and down to adjust the focal position.

Figure 28:
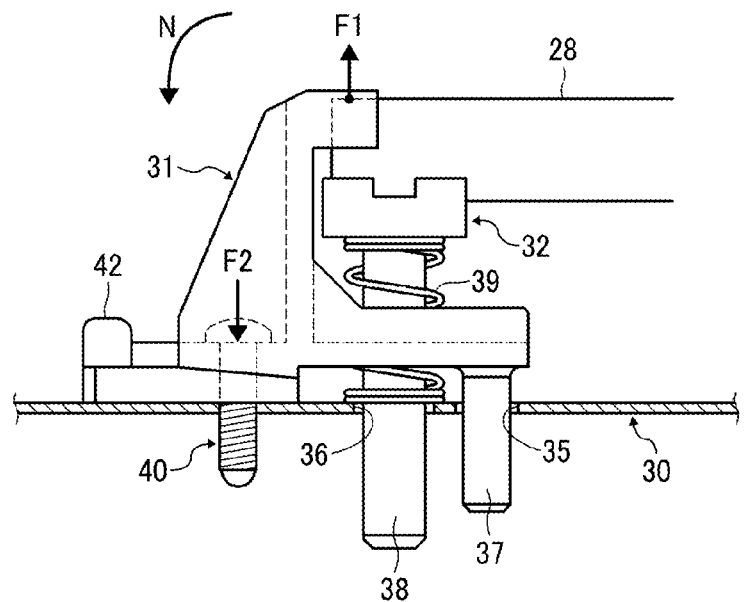
FIG. 28 is a view for explaining rotational momentum which acts on the upper holder.

However, as shown in FIG. 28, the upwards biasing force F1 by the coil spring 39 and the downwards pressing force F2 by the adjusting screw 40 act on the upper holder 31 at different positions in the main scanning direction, and thus rotational momentum N is generated. If the upper holder 31 tilts due to this rotational momentum N, the shaft 37 of the upper holder 31 may catch on the insertion hole 35, and thus smooth up and down movement of the upper holder 31 may be obstructed.

In response to this problem, when moving the CIS 28 downwards, malfunctions caused by catching of the shaft 37 can be avoided by increasing the strength of the pressing force F2 by the adjusting screw 40 on the upper holder 31. However, when moving the CIS 28 upwards, since the biasing force F1 by the coil spring 39 acts on the CIS 28 as well, the biasing force F1 must be restricted so that the CIS 28 does not break due to the biasing force F1. Thus, when moving the CIS 28 upwards, malfunctions tend to occur easily due to catching of the shaft 37 because it is difficult to impart a strong biasing force like that when moving the CIS 28 downwards.

Figure 29:
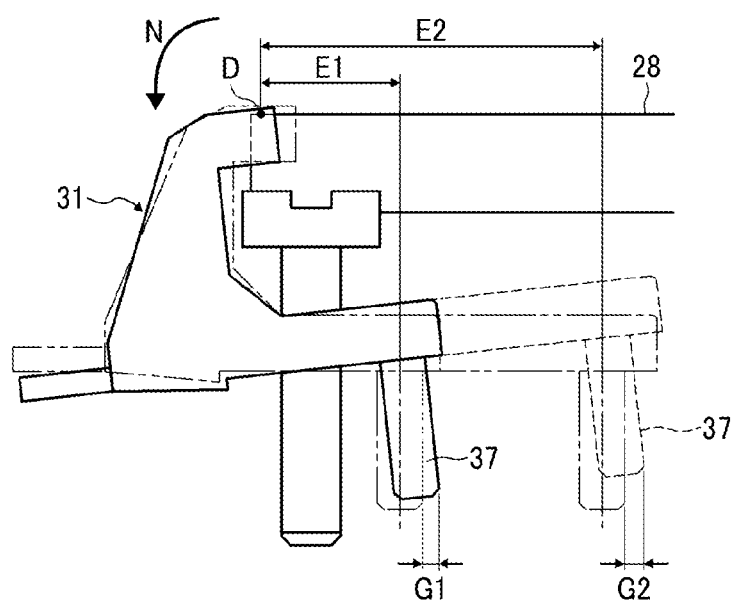
FIG. 29 is a schematic view of a state in which the upper holder is tilted due to rotational momentum.

FIG. 29 illustrates a state in which the upper holder 31 is tilted due to rotational momentum N. In FIG. 29, the degree of tilting is greatly exaggerated in order to make it easy to understand. As shown in FIG. 29, the upper holder 31 is inclined in the direction of the rotation momentum N centered on a contact part D with the CIS 28. Herein, comparing a case in which the distance in the horizontal direction of the shaft 37 of the upper holder 31 relative to the contact part D which is the center of rotation is large (the case of distance E2) versus a case in which this distance is small (the case of distance E1), the amount of deviation in the horizontal direction of the shaft 37 when the upper holder 31 is tilted is less in the case of the smaller distance compared to the case of the larger distance (G1<G2).

Figure 30:
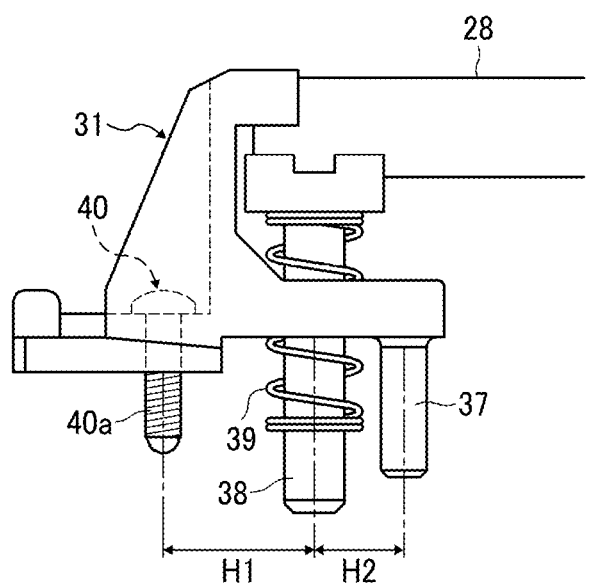
FIG. 30 is a view for explaining a relationship between the distance in the horizontal direction between the coil spring and the adjusting screw and the distance in the horizontal direction between the coil spring and the shaft of the upper holder.

Accordingly, disposing the shaft 37 of the upper holder 31 as close as possible to the contact part D enables interference with the insertion hole 35 to be suppressed and can contribute to smooth up and down movement of the upper holder 31. For example, in the present embodiment, as shown in FIG. 30, by setting a distance H2 in the horizontal direction between the coil spring 39 and the shaft 37 of the upper holder 31 to be smaller than a distance H1 in the horizontal direction between the coil spring 39 and the adjusting screw 40, the shaft 37 of the upper holder 31 is disposed so as to be closer to the contact part D.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image reading device, comprising:
    a contact glass;
    an image sensor to read image data from a document through the contact glass, the image sensor including plural reading elements arranged on an identical line along a main scanning direction;
    a holder to hold the image sensor;
    a mount to mount the holder, the mount including a screw hole and the holder being movable toward and away from the contact glass;

a biasing member to bias the holder toward the contact glass; and an adjusting screw, attached through the screw hole of the mount, to adjust a position of the holder relative to the contact glass against a biasing force of the biasing member by advancing and retreating in an axial direction of the screw hole, the biasing member and the adjusting screw being arranged on an identical straight line along the main scanning direction, wherein the holder includes an upper holder to hold an upper side of the image sensor and a lower holder to hold a lower side of the image sensor, each of the upper holder and the lower holder includes a shaft inserted into an insertion portion of the mount in a state in which each of the upper holder and the lower holder is movable toward and away from the contact glass, and the insertion portion and the screw hole are arranged on an identical straight line along the main scanning direction.

2. The image reading device according to claim 1, wherein the shaft of the upper holder is disposed to overlap with a non-reading face side opposite a reading face side of the image sensor on which the reading elements are arranged.

3. The image reading device according to claim 2, wherein the upper holder, the lower holder, and the adjusting screw are disposed at positions at which the upper holder, the lower holder, and the adjusting screw do not overlap with the reading elements arranged on the reading face side of the image sensor, and wherein the adjusting screw is attached to the screw hole from above.

4. The image reading device according to claim 1, wherein the biasing member biases the lower holder, and the adjusting screw presses the upper holder against the biasing force of the biasing member.

5. The image reading device according to claim 4, further comprising a holder support inserted between the upper holder and the mount, to support the upper holder.

6. The image reading device according to claim 5, wherein the holder support and the shaft of the upper holder are disposed on opposite sides relative to the shaft of the lower holder.

7. The image reading device according to claim 5, wherein the holder support has different heights in an insertion direction thereof.

8. The image reading device according to claim 5, wherein the holder support includes a positional shift stopper to interfere with the upper holder in a state in which the holder support is inserted between the upper holder and the mount, to prevent a positional shift of the upper holder in a direction perpendicular to an insertion direction of the holder support.

9. The image reading device according to claim 1, wherein the image sensors are arranged in linear rows in the main scanning direction with two rows in a sub-scanning direction perpendicular to the main scanning direction, and portions of reading elements in the adjacent rows of the image sensors oppose each other in the sub-scanning direction.

10. An image forming apparatus comprising an image reading device, the image reading device including
a contact glass,
an image sensor to read image data from a document through the contact glass, the image sensor including plural reading elements arranged on an identical line along a main scanning direction,
a holder to hold the image sensor,
a mount to mount the holder, the mount including a screw hole and the holder being movable toward and away from the contact glass,
a biasing member to bias the holder toward the contact glass, and
an adjusting screw, attached to the screw hole, to adjust a position of the holder relative to the contact glass against a biasing force of the biasing member by advancing and retreating in an axial direction of the screw hole, the biasing member and the adjusting screw being arranged on an identical straight line along the main scanning direction, wherein the holder includes an upper holder to hold an upper side of the image sensor and a lower holder to hold a lower side of the image sensor, each of the upper holder and the lower holder includes a shaft inserted into an insertion portion of the mount in a state in which each of the upper holder and the lower holder is movable toward and away from the contact glass, and the insertion portion and the screw hole are arranged on an identical straight line along the main scanning direction.

11. The image forming apparatus according to claim 10, wherein the shaft of the upper holder is disposed to overlap with a non-reading face side opposite a reading face side of the image sensor on which the reading elements are arranged.

12. The image forming apparatus according to claim 11, wherein the upper holder, the lower holder, and the adjusting screw are disposed at positions at which the upper holder, the lower holder, and the adjusting screw do not overlap with the reading elements arranged on the reading face side of the image sensor, and wherein the adjusting screw is attached to the screw hole from above.

13. The image forming apparatus according to claim 10, wherein the biasing member biases the lower holder, and the adjusting screw presses the upper holder against the biasing force of the biasing member.

14. The image forming apparatus according to claim 13, wherein the image reading device further comprises a holder support inserted between the upper holder and the mount, to support the upper holder.

15. The image forming apparatus according to claim 14, wherein the holder support and the shaft of the upper holder are disposed on opposite sides relative to the shaft of the lower holder.

16. The image forming apparatus according to claim 14, wherein the holder support has different heights in an insertion direction thereof.

17. The image forming apparatus according to claim 14, wherein the holder support includes a positional shift stopper to interfere with the upper holder in a state in which the holder support is inserted between the upper holder and the mount, to prevent a positional shift of the upper holder in a direction perpendicular to an insertion direction of the holder support.

18. The image forming apparatus according to claim 10, wherein the image sensors are arranged in linear rows in the main scanning direction with two rows in a sub-scanning direction perpendicular to the main scanning direction, and portions of reading elements in the adjacent rows of the image sensors oppose each other in the sub-scanning direction.

* * * * *